UNITED STATES PATENT OFFICE.

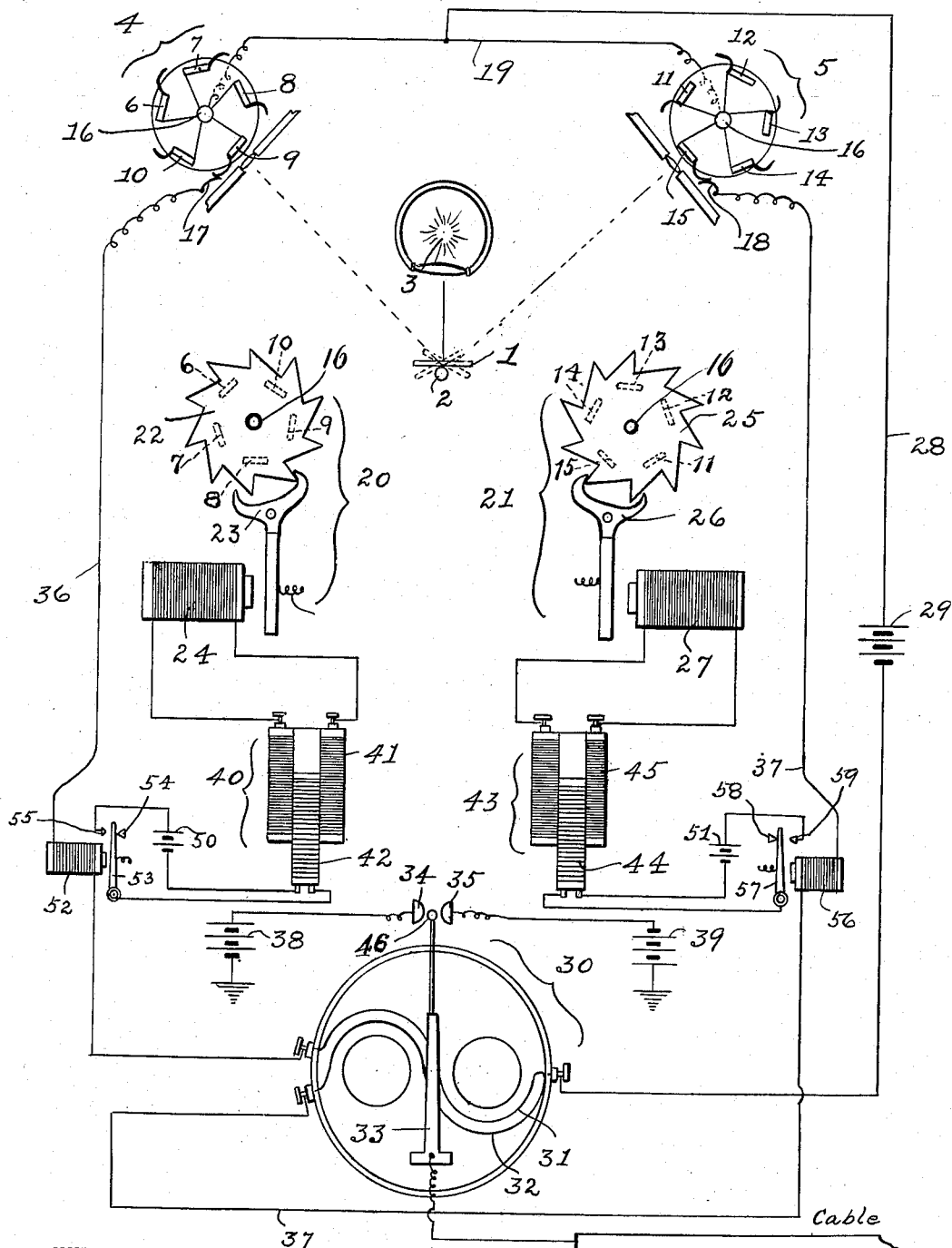

ISIDOR KITSEE, OF PHILADELPHIA, PENNSYLVANIA.

TELEGRAPHIC RELAY.

No. 900,553.

Specification of Letters Patent.

Patented Oct. 6, 1908.

Application filed February 14, 1908. Serial No. 415,892.

*To all whom it may concern:*

Be it known that I, ISIDOR KITSEE, citizen of the United States, residing at Philadelphia, in the county of Philadelphia and State of Pennsylvania, have invented certain new and useful Improvements in Telegraphic Relays, of which the following is a specification.

My invention relates to an improvement in telegraphic receiving organism. Its object is, to translate or relay telegraphic impulses with the aid of receiving devices inserted in the line and has more special reference to telegraphing over lines with distributed capacity, such as submarine cables.

To avoid any possibility of injury to the insulating coating of the cable, it is an essential condition that none but very weak currents should be employed and the receiving device has to be, therefore, of a very sensitive nature.

With devices as are now employed in cable telegraphy, such as a reflecting galvanometer or siphon recorder, the messages transmitted can only be read with the aid of the flash or recorded curves. It is the aim of my invention to translate these impulses into sound, if so required, or to relay the same automatically to another line. I make use of the property of a selenium cell to change the resistance through rays of light. A selenium cell having normally a great resistance will offer to the flow of the current far less resistance when exposed to such rays. To intensify the change, it is only necessary either to expose the cell for a greater length of time to light rays, or to intensify these rays. The operator, therefore, has it in his power to quickly decrease the resistance of such cells, but I have found that in practice the cell, once exposed to intense rays, will not regain its former status at once after the exposure to the rays has ceased, and it takes an appreciable time till the resistance of the cell has again become a normal one. When a selenium cell has to be used as a medium for translating telegraphic impulses, this behavior is of the greatest disadvantage, for the reason that if exposed a few times in quick succession to the rays of light, the cell cannot be depended upon to operate an electromagnetic device through the change of resistance. I found it is necessary to so arrange matters that a selenium cell shall be given a long period of rest after having been exposed to the rays of light.

In the accompanying drawing, I have illustrated a system of translating received impulses with the aid of selenium cells and I have illustrated one mode of substituting, after each impulse received, a fresh cell for the one previously exposed to the rays of light; it being obvious that the arrangement may differ to suit requirements. I have also illustrated one arrangement with the aid of which the received impulses may be relayed to a second cable and with the aid of which a series of selenium cells may be moved, so as to expose successively successive cells to the rays of light; it being understood that other means may be provided therefor without departing from the scope of my invention.

The drawing represents in diagrammatic view a relaying arrangement embodying my invention.

In this drawing, 1 is a reflector, such as a mirror, supported by the movable part of a receiving device inserted in the line. This movable part may consist, in the case where a reflecting galvanometer is employed, of the movable needle and where the recorder is employed, of the siphon itself, or any device substituted for said siphon and this support is designated by the numeral 2.

3 is a source of light.

4 and 5 are organisms of selenium cells; the organism 4 comprising the cells 6, 7, 8, 9 and 10 and the organism 5 comprising the cells 11, 12, 13, 14 and 15. Each cell is provided with two terminals; one terminal of each cell centers in the conducting ring 16 and the other terminal of each cell is placed in a position so that in the revolving of the organism, the same may connect with the brushes 17 or 18 if in proximity thereto. The rings 16 are connected together electrically through the wire 19. The means to move or rotate the selenium cells are here shown as step-by-step movements 20 and 21; the step-by-step movement 20 comprising the ratchet wheel 22, the pawl 23 and the electro-magnet 24. The means 21 are here shown as comprising the ratchet wheel 25, the pawl 26 and the electro-magnet 27. In this arrangement, the selenium cells 6, 7, 8, 9 and 10 are, in reality, mounted on the wheel 22 and the selenium cells 11, 12, 13, 14 and 15 on the wheel 25. To better illustrate this part of my invention I have not shown the organisms 4 and 5 in conjunction with the means 20 and 21, but I have indicated the mounting of these cells on the wheels by dotted lines.

30 is an electro-magnetic device here shown as a polarized differential relay comprising the windings 31 and 32, and the armature 33. The junction of these windings is connected with one pole of the source of current, here shown as battery 29; the other pole of said battery is connected through wire 28 with wire 19. The free terminal of winding 31 is connected through wire 36 with brush 17. The free terminal of winding 32 is connected through wire 37 with brush 18. I have provided the armature 33 with the clapper 46. In proximity to this clapper are the gongs 34 and 35; the gong 34 connected with the positive pole of the source of current 38; the negative pole of said source is grounded. The gong 35 is connected to the negative pole of the source 39; the positive pole of which is grounded.

40 and 43 are inductoriums. The primary 42 of 40 is included in the circuit containing the source 50 and the secondary 41 thereof is connected to the coil of electromagnet 24. The primary 44 of 43 is inserted in the circuit of the source 51 and the secondary 45 is connected to the coil of electromagnet 27. In the wire 36 is inserted the electro-magnet 52 provided with the armature 53 normally held against the stop 54. The source 50 is connected with one pole to the stops 55 and with the other pole to the armature 53. In the wire 37 is connected the electro-magnet 56 provided with the armature 57 resting normally against the stop 58. The source 51 is connected with one pole to the stop 59 and with the other pole to the armature 57. Normally, therefore, the circuits of the source 50 as well as 51 are open.

I will now describe the operation of the arrangement as illustrated: Normally, that is, when the movable part of the receiving device is at its zero position, the reflector or mirror 1 is, as stated above, in a position as is indicated in solid line on the drawing. It is now supposed that the incoming impulses have an ultimate effect on the support 2, so as to deflect the same to the right or left in accordance with the polarity of the impulse impressed upon the line.

As stated above, the arrangement as described may be applied to any of the different systems of cable telegraphy, but it is supposed that the system of transmitting true reversals is here employed. In this system, each character of the alphabet is characterized by two impulses; the dot by two impulses following each other in quick succession and the dash by two impulses following each other after the necessary unit of time has passed. In this system, the impulses are always of opposite polarity. It is supposed that the first impulse is always a positive and the deflection of the support and reflector is therefore to the right and the second or closing impulse is a negative and that therefore the deflection of the support and reflector is to the left. In its normal condition, both step-by-step movements will be idle and one selenium cell of each of the selenium organisms will be exposed to the deflected rays of light if the mirror has changed its position but they will not be exposed to any rays of light as long as the mirror remains at zero.

In the drawing, the cell 9 of the organism 4 is right opposite the aperture through which the rays of light may be admitted and oppositely the cell 15 of the organism 5 is also opposite the aperture through which the rays of light may be admitted. It is now supposed that the operator at the transmitting station transmits the letter A consisting of a dot and a dash. He impresses upon the line a positive impulse whereby the mirror deflects to the right and in quick succession a negative impulse whereby the mirror deflects to the left. As soon as through the deflection to the right, the deflected rays are impressed upon the cell 15, the resistance of the same is lowered in a manner so that the current from the battery 29 can pass through this cell and the circuit for said current will be as follows:—From the positive pole of the source 29, through wire 28, part of the wire 19, ring 16 of the organism 5, selenium cell 15, brush 18, wire 37, through winding 32 of the device 30 and return to the negative pole of said source.

We assume that the arrangement of the device 30 is such that through the passing of this current through 32, the armature is made to contact with the contact or gong 35. When this device 30 is only made to open and close another circuit, such for instance as contains a sounder, then 34 and 35 should be simply forward stops, but when no other device is present, the forward stops should be replaced by gongs as illustrated and the operator will soon ascertain through the different tones of the gongs the character transmitted. It may be stated that one gong, for instance the gong to the left, may be likened to the lower stop of a sounder and the gong, for instance to the right, the upper stop of the sounder.

When the operator has, through the depression of his key, impressed upon the line a positive impulse and this impulse has, as stated, thrown the armature 33 in contact with 35, he releases after one unit of time the lever of the key and the releasing of this lever will impress upon the line a negative impulse. This negative impulse will move the support 2 and the mirror 1 so as to deflect to the left. The rays of light will, therefore, be impinged upon the selenium cell 9 and the resistance of this cell will be lowered so as to allow the current from 29 to flow through the following circuit:—The positive pole of 29, wire 28, ring 16 of selenium organism 4, selenium cell 9, brush 17, wire 36, electro-magnet 52, and winding 31 of the device 30. Through the flow of this current through electro-magnet 52, the armature 53 will be drawn towards and in contact with the stop 55. The circuit containing source 50 will be made and an impulse will be generated in the secondary 41 of the device 40, thereby operating the step-by-step movement. After the passing of this impulse, the support 2 and therefore the mirror 1 will again resume the normal position and the electro-magnet 52 will be de-energized, the armature 53 will, therefore, again break its contact with 55; the circuit including the source 50 will be broken and a second impulse will be generated in the secondary 41 of the device 40. These two impulses will operate the step-by-step movement 20 in a manner so as to bring out of circuit the selenium cell 9 and bring into circuit the selenium cell 10. The result of the negative impulse on the device 30 is such as to force the armature 33 away from the stop or gong 35 and towards and in contact with the stop or gong 34.

When the operator desires to transmit a dash, he depresses the key thereby sending a positive impulse upon the line and deflecting again the mirror to the right, lowering in the resistance of the cell 14, operating the circuit containing the electro-magnet 56 and the device 30 in a manner so that the circuit containing the source 51 will be made and again broken thereby operating the step-by-step movement in a manner so as to take out of circuit the selenium cell 14 and bring into circuit selenium cell 13 and forcing the armature 33 of the device 30 in contact with the gong 35; but as a dash is to be transmitted, the operator depresses his key for three units of time and then in releasing the key, he impresses upon the line again an impulse of negative polarity, whereby the former operation of the selenium organism 4 is repeated. The time unit, therefore, between the first and second impulse denotes whether a dot or dash is transmitted.

Having now described my invention, what I claim as new and desire to secure by Letters Patent is:—

1. In a telegraphic receiving device, a local circuit, a selenium organism comprising a series of independent selenium cells, means to lower the resistance of said cells through the incoming impulses, and means to move, after each impulse, the selenium cell formerly in the local circuit out of said circuit and to move a selenium cell, formerly out of said circuit, in operative connection with said circuit.

2. In a device of the class described, a series of selenium cells, a support for the same, means to conduct the incoming impulses, electro-magnetic means depending on the incoming impulses to place successively successive selenium cells in the path of the rays of light, and a local circuit adapted to be operated by one or the other of said selenium cells.

3. In a device of the class described, a series of selenium cells, and electro-magnetic means to replace the selenium cell acted upon by the rays of light with a selenium cell in its normal state and a local circuit containing a translating device and adapted to be operated by the selenium cells acted upon by the rays of light.

4. In a device of the class described, two series of selenium cells, and electro-magnetic means for each of said series to place in the circuit a selenium cell of normal resistance after the lowering of the resistance of a neighboring cell.

5. In a device of the class described, a relay inserted in the line of transmission, a series of selenium cells, means to lower the resistance of one of said cells through rays of light deflected with the aid of said relay, and means operatively related to said series of cells to take out of the circuit the cell with lower resistance and place in its stead a cell of normal resistance.

6. In a device of the class described, means to receive impulses with the aid of selenium cells, and electro-magnetic means to substitute, for the cell acted upon by the rays of light, a second cell of normal resistance.

7. In combination with a telegraphic relay inserted in the line of transmission, a selenium organism comprising a series of selenium cells, means to lower the resistance of one or the other of said cells through the incoming impulses, a local circuit, and electro-magnetic means in said circuit to replace the cell acted upon with a cell of normal resistance.

8. In combination with a telegraphic relay inserted in the line of transmission, two selenium organisms, each comprising a series of selenium cells, means to decrease the resistance of a cell of one or the other of said organisms through the incoming impulses, a local circuit for each of said organisms and electro-magnetic means in each of said local circuits to replace each of the cells acted upon with a cell of normal resistance.

In testimony whereof I affix my signature in presence of two witnesses.

ISIDOR KITSEE.

Witnesses:
MARY C. SMITH,
EDITH R. STILLEY.